United States Patent
Oberndorfer et al.

(10) Patent No.: US 10,633,083 B2
(45) Date of Patent: Apr. 28, 2020

(54) UNMANNED AERIAL VEHICLE AND METHOD FOR DRIVING AN UNMANNED AERIAL VEHICLE

(71) Applicant: Intel IP Corporation, Santa Clara, CA (US)

(72) Inventors: Fabian Oberndorfer, Krailling (DE); Stefan Klar, Planegg (DE)

(73) Assignee: INTEL IP CORPORATION, Santa Clara, CA (US)

( * ) Notice: Subject to any disclaimer, the term of this patent is extended or adjusted under 35 U.S.C. 154(b) by 226 days.

(21) Appl. No.: 15/718,037

(22) Filed: Sep. 28, 2017

(65) Prior Publication Data

US 2019/0092459 A1    Mar. 28, 2019

(51) Int. Cl.
*B64C 27/12*  (2006.01)
*B64C 39/02*  (2006.01)
*B64D 27/24*  (2006.01)

(52) U.S. Cl.
CPC ............ *B64C 27/12* (2013.01); *B64C 39/024* (2013.01); *B64D 27/24* (2013.01); *B64C 2201/042* (2013.01); *B64C 2201/108* (2013.01); *B64C 2201/141* (2013.01)

(58) Field of Classification Search
CPC ........ B64C 2201/042; B64C 2201/108; B64C 2201/141; B64C 27/12; B64C 11/48; B64C 2201/027; B64D 27/24; B64D 35/02; B64D 35/06; B64D 35/08
USPC ...................................................... 244/17.23
See application file for complete search history.

(56) References Cited

U.S. PATENT DOCUMENTS

| | | | |
|---|---|---|---|
| 10,116,187 B1* | 10/2018 | Wishart | H02K 7/14 |
| 2007/0130913 A1* | 6/2007 | Harrison | B64C 11/001 |
| | | | 60/226.3 |
| 2010/0108801 A1* | 5/2010 | Olm | B64C 39/024 |
| | | | 244/17.23 |
| 2013/0127284 A1* | 5/2013 | Hamann | H02K 7/14 |
| | | | 310/156.35 |
| 2016/0001875 A1* | 1/2016 | Daler | B64D 45/04 |
| | | | 244/17.23 |
| 2016/0122012 A1* | 5/2016 | Choo | B64C 39/028 |
| | | | 244/17.23 |
| 2016/0200207 A1* | 7/2016 | Lee | B60L 11/1824 |
| | | | 320/109 |
| 2016/0211720 A1* | 7/2016 | Koegler | F16C 1/00 |
| 2016/0251077 A1* | 9/2016 | Amino | B64C 39/024 |
| | | | 244/17.23 |
| 2017/0190421 A1* | 7/2017 | Diez-Garias | A63H 27/12 |
| 2017/0274984 A1* | 9/2017 | Beckman | B64C 11/50 |
| 2017/0283042 A1* | 10/2017 | Gamble | B64C 27/10 |
| 2017/0369153 A1* | 12/2017 | Vion | B64C 11/18 |
| 2018/0044029 A1* | 2/2018 | Koegler | B64D 27/24 |
| 2019/0177935 A1* | 6/2019 | Kim | E01F 9/70 |

* cited by examiner

*Primary Examiner* — Claude J Brown
(74) *Attorney, Agent, or Firm* — Viering, Jentschura & Partner mbB

(57) ABSTRACT

According to various aspects, an unmanned aerial vehicle may include one or more electric drive motors. Each drive motor of the one or more electric drive motors may include a first drive rotor structure; a second drive rotor structure, the first drive rotor structure being coaxially aligned with the second drive rotor structure, the first drive rotor structure including a first magnetic arrangement and the second drive rotor structure including a second magnetic arrangement.

20 Claims, 5 Drawing Sheets

FIG 5

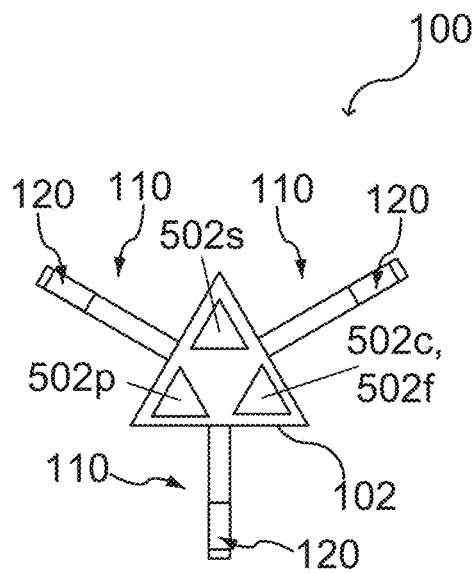

FIG 6

Supplying electrical power to an electrical drive motor, the electrical drive motor including a first magnetic arrangement being mounted to a first drive rotor structure and a second magnetic arrangement being mounted to a second drive rotor structure, the first drive rotor structure being coaxially aligned with the second drive rotor structure, and the first drive rotor structure being coupled to a top propeller and the second rotor structure being coupled to a bottom propeller Generating a first rotational moment associated with the first drive rotor structure and a second counteracting rotational moment associated with the second drive rotor structure via the first magnetic arrangement and the second magnetic arrangement such that the first drive rotor structure and the second drive rotor structure rotate in opposite rotational directions.

UNMANNED AERIAL VEHICLE AND METHOD FOR DRIVING AN UNMANNED AERIAL VEHICLE

TECHNICAL FIELD

Various aspects relate generally to an unmanned aerial vehicle and methods thereof, e.g., to a method for driving an unmanned aerial vehicle.

BACKGROUND

In general, an unmanned aerial vehicle (UAV) may be driven by one or more electric drive motors. The electric motors may be controlled for example by a motor controller and/or a flight controller of the unmanned aerial vehicle. The unmanned aerial vehicle may include a flight controller that is configured to navigate the unmanned aerial vehicle at least temporarily autonomously, e.g., without a user input associated with a flight path, a destination point, etc. The one or more electric drive motors of an unmanned aerial vehicle may be configured to allow hovering of the unmanned aerial vehicle as well as rotating around the z-axis and moving along the spatial directions.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 5 shows an unmanned aerial vehicle including at least three vehicle drive arrangements in a schematic view, according to various aspects, FIG. 6 shows an exemplary method for driving an unmanned aerial vehicle, according to some aspects.

DESCRIPTION

Figure 1A:
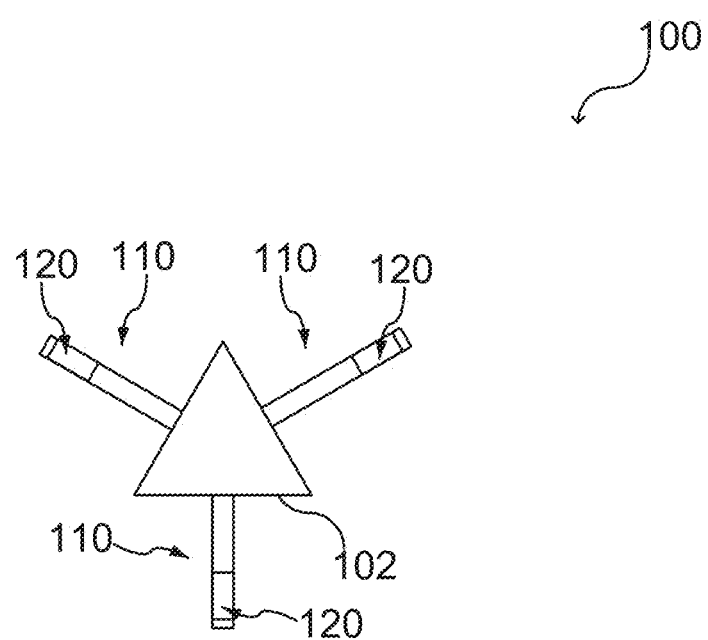
FIG. 1A and FIG. 1B illustrate an unmanned aerial vehicle and an electric drive motor in a schematic view, according to various aspects.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., in the description and in the claims, if any, refer to a quantity equal to or greater than one, i.e. one or more.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

Various aspects relate to an electric drive motor of an unmanned aerial vehicle. The electric drive motor may be a coaxial drive arrangement including two propellers. The two propellers may be a top propeller and a bottom propeller arranged along a vertical direction above each other. The vertical direction may be defined, for example, by the geometry of the unmanned aerial vehicle. The unmanned aerial vehicle may have, for example, a plurality of electric drive motors arranged substantially within a single plane defining a horizontal plane and a vertical direction being aligned perpendicular to the horizontal plane.

According to various aspects, an electric drive motor may be provided that is configured to drive two propellers at the same time in opposite rotational directions. The two propellers may be spaced apart from one another and coaxially arranged. Therefore, the electric drive motor may generate a smaller yaw momentum on a frame of the unmanned aerial vehicle as a conventional single motor driving a single propeller. According to various aspects, the electric drive motor may be configured to generate a momentum (in other words a torque) to rotate a first propeller and a counter momentum (in other words a counter torque) to the momentum to rotate a second propeller, as described in more detail below.

In contrast to conventional electric motors, the electric drive motor according to various aspects may not include a fixed stator. In the electric drive motor design, as described herein, a first drive rotor and a second drive rotor interact with one another and counter-rotate against one another. As an example, two drive rotor structures may be used that counter-rotate against one another driven by a magnetic interaction between these two drive rotor structures. The magnetic interaction may be provided by magnetic arrangements mechanically coupled with each of the drive rotor structures.

Each of the two drive rotor structures may include a drive shaft that connects the drive rotor structure to a frame (e.g., a support frame) of the unmanned aerial vehicle via at least one bearing. Optionally, both drive shafts of the two drive rotor structures may be connected with one another through at least one further bearing (also referred to as third bearing). A propeller may be mounted to the end of each drive shaft. To eliminate yaw momentum the propellers may turn in opposite directions (e.g., clockwise and counter clockwise). Furthermore, according to various aspects, the bottom propeller may have a smaller diameter, a higher pitch and/or may turn faster than the top propeller. According to various aspects, at least one of the drive rotor structures may be electrically connected to a motor controller and a power supply to control movement of the drive rotor structures. The electrical contacting of the rotating parts of the drive rotor structures may be realized via an electric slip contact, e.g., via one or more slip rings, one or more brushes, etc. An unmanned aerial vehicle may be, for example, a drone.

According to various aspects, the electric drive motor described herein may have less electronic weight than conventional drive motors (e.g., less motor, less controllers, and/or wires may be used). According to various aspects, the electric drive motor described herein may have less mechanic weight than conventional drive motors (e.g., only half of the numbers of motor arms may be used). According to various aspects, the electric drive motor described herein is a compact drive system (e.g., half of the surface may be used compared to two propellers side by side). Further, using the electric drive motors for an unmanned aerial vehicle may allow using bigger propellers, since, for example, the yaw momentum is at least partially (or even completely) compensated. Further, using the electric drive motors for an unmanned aerial vehicle may improve the wind stability of the unmanned aerial vehicle during flight (e.g., less wind may be exposed to the propeller surface). Further, it may be easier to protect the pairs of top and bottom propellers with small and lightweight propeller protection.

In the following, an unmanned aerial vehicle is described, according to various aspects. The unmanned aerial vehicle may be illustrated and described in some aspects based on three vehicle drive arrangements including one electric drive motor respectively. However, other configurations may be used, e.g., more than three (e.g., four, five, six, seven, eight of more than eight) vehicle drive arrangements may be used, e.g., including one electric drive motor respectively. Further, a vehicle drive arrangement may include more than one electric drive motors, e.g., two electric drive motors may be provided within a single vehicle drive arrangement. According to various aspects, the plurality of vehicle drive arrangements of an unmanned aerial vehicle may be aligned with a rotational and/or mirror symmetry.

FIG. 1A illustrates an unmanned aerial vehicle 100 in a schematic view, according to various aspects. The unmanned aerial vehicle 100 may include a frame 102 (e.g., a support frame). In some aspects, the frame 102 may be a central mechanical part of the unmanned aerial vehicle 100 to mount one or more electrical components, e.g., one or more controllers, one or more power supplies, one or more sensors, etc. Further, one or more mechanical components may be mounted to the frame 102. According to various aspects, the unmanned aerial vehicle 100 may include at least three vehicle drive arrangements 110 coupled to the frame. The shape and/or size of the frame 102 may be designed as desired to provide the respective functions of the unmanned aerial vehicle 100.

According to various aspects, each vehicle drive arrangement 110 of the at least three vehicle drive arrangements 110 may include an electric drive motor 120. The vehicle drive arrangements 110 may be a substantially similar or the same with respect to their size, function, shape, etc.

Figure 1B:
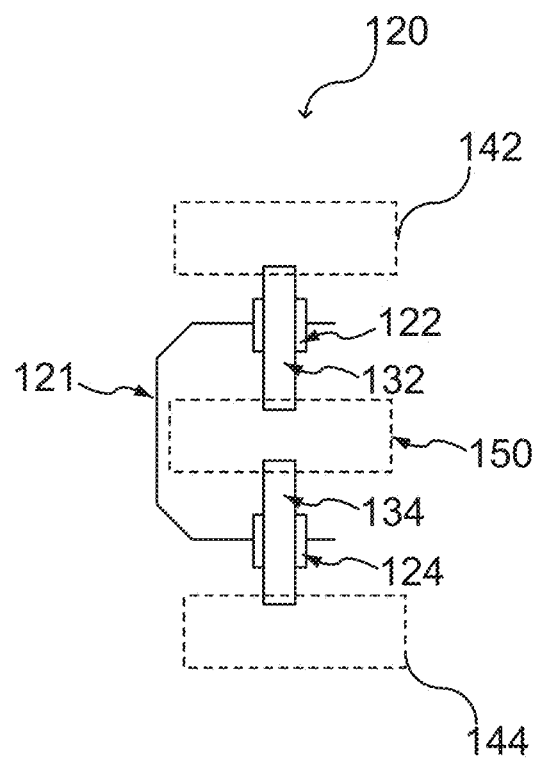

FIG. 1B illustrates an electric drive motor 120 of a vehicle drive arrangement 110 of an unmanned aerial vehicle (e.g., the unmanned aerial vehicle 100 described with respect to FIG. 1A) in a schematic view, according to various aspects.

According to various aspects, the electric drive motor 120 may include a mount structure 121. In some aspects, the mount structure 121 may be mechanically coupled to the frame 102 of the unmanned aerial vehicle 100. The mount structure 121 may provide a support structure to arrange one or more components of the electric drive motor 120.

According to various aspects, the electric drive motor 120 may include one or more bearings. As illustrated in FIG. 1B, the electric drive motor 120 may include a first bearing 122 and a second bearing 124. The first bearing 122 and the second bearing 124 may be mounted to the mount structure 121. According to various aspects, the first bearing 122 and the second bearing 124 may be a rotational bearings, e.g., including at least one bearing of the following group of rotational bearings: a ball bearing, a roller bearing, a cone bearing, etc.

According to various aspects, the first bearing 122 and the second bearing 124 may be configured to allow an axial rotation e.g. a drive shaft rotation and/or a rotation of a drive rotor structure. Further, the first bearing 122 and the second bearing 124 may be configured to prevent a linear motion. In other words, the first bearing 122 and the second bearing 124 may include radial axial bearings. It is understood that any single bearing detailed herein may be realized as two (or more) separate bearings provided with equivalent functionality.

According to various aspects, the electric drive motor 120 may include a first drive rotor structure 132. The first drive rotor structure 132 may be rotatably mounted at the mount structure 121. In some aspects, the first drive rotor structure 132 may be mounted to the mount structure 121 via the first bearing 122.

According to various aspects, the electric drive motor 120 may include a second drive rotor structure 134. The second drive rotor structure 134 may be rotatably mounted at the mount structure 121. In some aspects, the second drive rotor structure 134 may be mounted to the mount structure 121 via the second bearing 124.

As exemplarily illustrated in FIG. 1B, the electric drive motor 120 may be configured to mount a first propeller in a first region 142, e.g., coupled to the first drive rotor structure 132. Further, the electric drive motor 120 may be configured to mount a second propeller in a second region 144, e.g., coupled to the second drive rotor structure 134.

Further, as exemplarily illustrated in FIG. 1B, the electric drive motor 120 may be configured to mount magnetic arrangements in a further region 150, e.g., between the first bearing 122 and the second bearing 124. The magnetic arrangements may be for example mounted to the first drive rotor structure 132 and the second drive rotor structure 134 to generate a first rotational moment associated with the first drive rotor structure 132 and a second counteracting rotational moment associated with the second drive rotor structure 134 to rotate the first drive rotor structure 132 and the second drive rotor structure 134 in opposite rotational directions. Illustratively, the first drive rotor structure 132 and the second drive rotor structure 134 are rotated in opposite rotational directions based on a single drive structure (e.g., disposed between the drive rotor structures 132, 134) generating the corresponding rotational moments (or torques).

Figure 2:
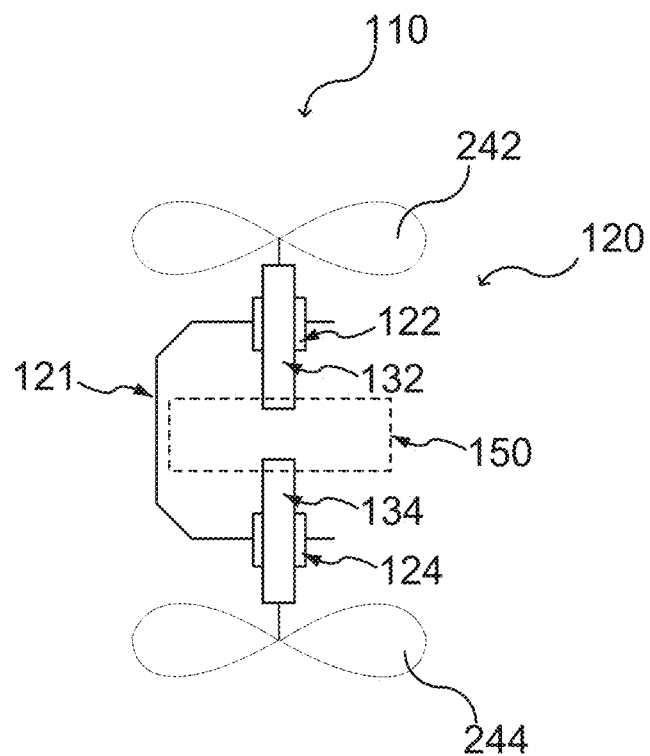
FIG. 2 shows a vehicle drive arrangement of an unmanned aerial vehicle in a schematic view, according to various aspects.

FIG. 2 illustrates a vehicle drive arrangement 110 of an unmanned aerial vehicle (e.g., of the unmanned aerial vehicle 100 described with respect to FIG. 1A and/or FIG. 1B) in a schematic view, according to various aspects. The vehicle drive arrangement 110 may include an electric drive motor (e.g., the electric drive motor 120 described above).

According to various aspects, the vehicle drive arrangement 110 may include a first propeller 242 and a second propeller 244 that are both mechanically coupled to the electric drive motor 120. According to various aspects, the first propeller 242 may be coupled to the first drive rotor structure 132 and the second propeller 244 may be coupled to the second drive rotor structure 134. The first propeller 242 and the second propeller 244 may be coupled directly to the respective drive rotor structure 132, 134, e.g., without a transmission or gearbox in between.

According to various aspects, the first propeller 242 may have a first propeller pitch and the second propeller 244 may have a second propeller pitch. The first propeller pitch may be different from the second propeller pitch, e.g., the second propeller pitch may be greater than the first propeller pitch or vice versa. In another aspect, the first propeller pitch may be equal to the second propeller pitch. According to various aspects, the first propeller pitch and/or the second propeller pitch may be fixed, also referred to as fixed pitch propeller. Since an angle of attack of the fixed pitch propellers cannot be varied during flight, the flight (e.g., ascent and descent) may be controlled by controlling the angular velocity of the propellers 242, 244.

According to various aspects, the first propeller 242 may have a first diameter and the second propeller 244 may have a second diameter that is different from the first diameter, e.g., the first diameter is greater than the second diameter (see FIG. 7) or vice versa. This may allow using the free space that may be reserved for the propellers efficiently. Alternatively, both propellers 242, 244 may have the same diameter.

According to various aspects, the first propeller 242 may be a top propeller and the second propeller 244 may be a bottom propeller.

Further, as exemplarily illustrated in FIG. 2, the electric drive motor 120 may be configured to provide space for magnetic arrangements, e.g., in a further region 150 between the first bearing 122 and the second bearing 124, as described in more detail below.

Figure 3A:
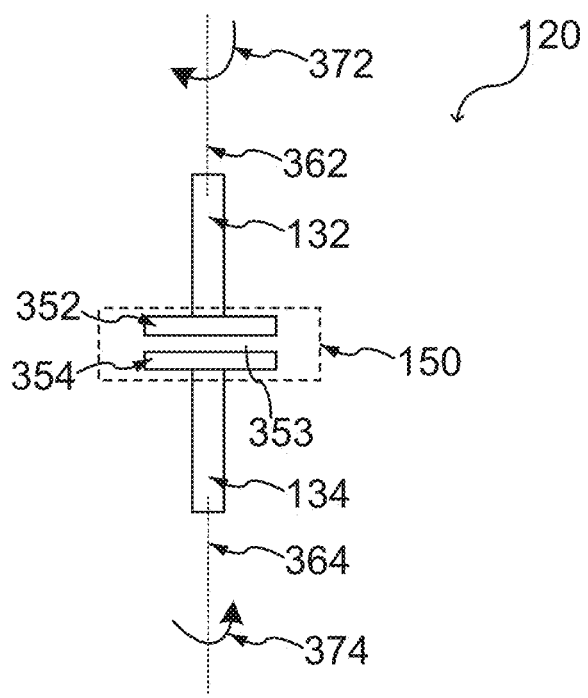
FIG. 3A and FIG. 3B illustrate an electric drive motor of an unmanned aerial vehicle in a schematic view, according to various aspects.
Figure 3B:
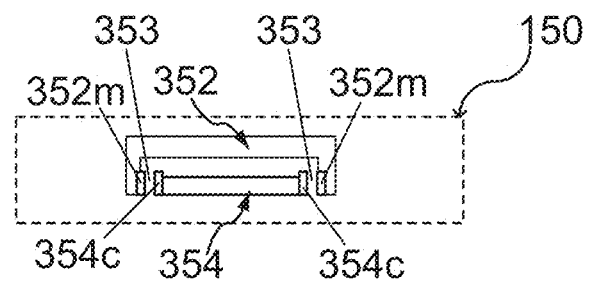

FIG. 3A and FIG. 3B respectively illustrate an electric drive motor 120 of an unmanned aerial vehicle (e.g., of the unmanned aerial vehicle 100 described with respect to FIG. 1A, FIG. 1B and/or FIG. 2).

According to various aspects, the electric drive motor 120 may further include a first magnetic arrangement 352. The first magnetic arrangement 352 may be disposed at the first drive rotor structure 132. The first magnetic arrangement 352 may be at least partially integrated into the first drive rotor structure 132. As an example, the first magnetic arrangement 352 may include at least a portion of a ferroelectric material to arrange one or more permanent magnets 352*m* at the first drive rotor structure 132 via the portion of the ferroelectric material (see FIG. 3B).

Further, the electric drive motor 120 may further include a second magnetic arrangement 354. The second magnetic arrangement 354 may be disposed at the second drive rotor structure 134. The second magnetic arrangement 354 may be at least partially integrated into the second drive rotor structure 134. As an example, the second magnetic arrangement 354 may include at least a receiving portion to arrange one or more magnet coils 354*c* (also referred to as electromagnetic coils, inductor coils) at the second drive rotor structure 134 (see FIG. 3B).

As illustrated in FIG. 3A and FIG. 3B, the electric drive motor 120 may further include an air gap 353 between the first magnetic arrangement 352 and the second magnetic arrangement 354. This allows, for example, a rotational movement of the first magnetic arrangement 352 and the second magnetic arrangement 354 in opposite rotational directions 372, 374; to rotate the first drive rotor structure 132 and the second drive rotor structure 134 in opposite rotational directions 372, 374, and to rotate the first propeller 242 and the second propeller 244 in opposite rotational directions 372, 374.

According to various aspects, the first magnetic arrangement 352 may include at least one of a permanent magnet arrangement or an electromagnetic coil arrangement. The second magnetic arrangement 354 may include a permanent magnet arrangement in the case that the first magnetic arrangement 352 includes an electromagnetic coil arrangement. Where the first magnetic arrangement 352 includes a permanent magnet arrangement, the second magnetic arrangement 354 may include an electromagnetic coil arrangement. Further, both the first magnetic arrangement 352 and the second magnetic arrangement 354 may include an electromagnetic coil arrangement, e.g., one or more inductor coils and one or more magnet coils.

The respective electromagnetic coil arrangement may be controlled by one or more motor controllers to provide a first rotational moment associated with the first drive rotor structure 132 and a second counteracting rotational moment associated with the second drive rotor structure 134 to rotate the first drive rotor structure 132 and the second drive rotor structure 134 in opposite rotational directions 372, 374.

There may be various possible configurations for the first magnetic arrangement 352 and the second magnetic arrangement 354 to provide a first rotational moment associated with the first drive rotor structure 132 and a second counteracting rotational moment associated with the second drive rotor structure 134. As illustrated, for example, in FIG. 3B, the first magnetic arrangement 352 may at least partially surround the second magnetic arrangement 354.

The first magnetic arrangement 352 and the second magnetic arrangement 354 may be disposed in the region 150 of the electric drive motor 120, e.g., between the first bearing and the second bearing. In other words, the first magnetic arrangement 352 and the second magnetic arrangement 354 may be disposed between the first propeller 242 and the second propeller 244 of the respective vehicle drive arrangement 110 (see FIG. 2).

As illustrated in FIG. 3A, the first drive rotor structure 132 may be rotatably mounted. In other words, the drive rotor structure 132 may be mounted such that a rotation 372 around a first rotational axis 362 is allowed. Further, the second drive rotor structure 134 may be rotatably mounted. In other words, the second drive rotor structure 134 may be mounted such that a rotation 374 around a second rotational axis 364 is allowed. According to various aspects, the first rotational axis 362 and the second rotational axis 364 may be coaxial, as illustrated, for example, in FIG. 3A.

Illustratively, an unmanned aerial vehicle may include a frame 102 and at least three vehicle drive arrangements 110 coupled to the frame 102, each vehicle drive arrangement 110 of the at least three vehicle drive arrangements 110 including an electric drive motor 120 (as illustrated, for example, in FIG. 1). The electric drive motor 120 including, as illustrated in FIG. 3A and FIG. 3B, a first drive rotor structure 132 and a second drive rotor structure 134, the first drive rotor structure 132 being coaxially aligned with the second drive rotor structure 134, the first drive rotor structure 132 including a first magnetic arrangement 352 and the second drive rotor structure 134 including a second magnetic arrangement 354.

According to various aspects, an electric drive motor for an unmanned aerial vehicle may include a first drive rotor structure 132 and a second drive rotor structure 134, the first drive rotor structure 132 may be coaxially aligned with the second drive rotor structure 134, and the first drive rotor structure 132 may include a first magnetic arrangement 352 and the second drive rotor structure may include a second magnetic arrangement 354. As described herein, the first magnetic arrangement and the second magnetic arrangement may be configured to provide a first rotational moment associated with the first drive rotor structure 132 and a second counteracting rotational moment associated with the second drive rotor structure 134 to rotate the first drive rotor structure 132 and the second drive rotor structure 134 in opposite rotational directions 372, 374.

Figure 4:
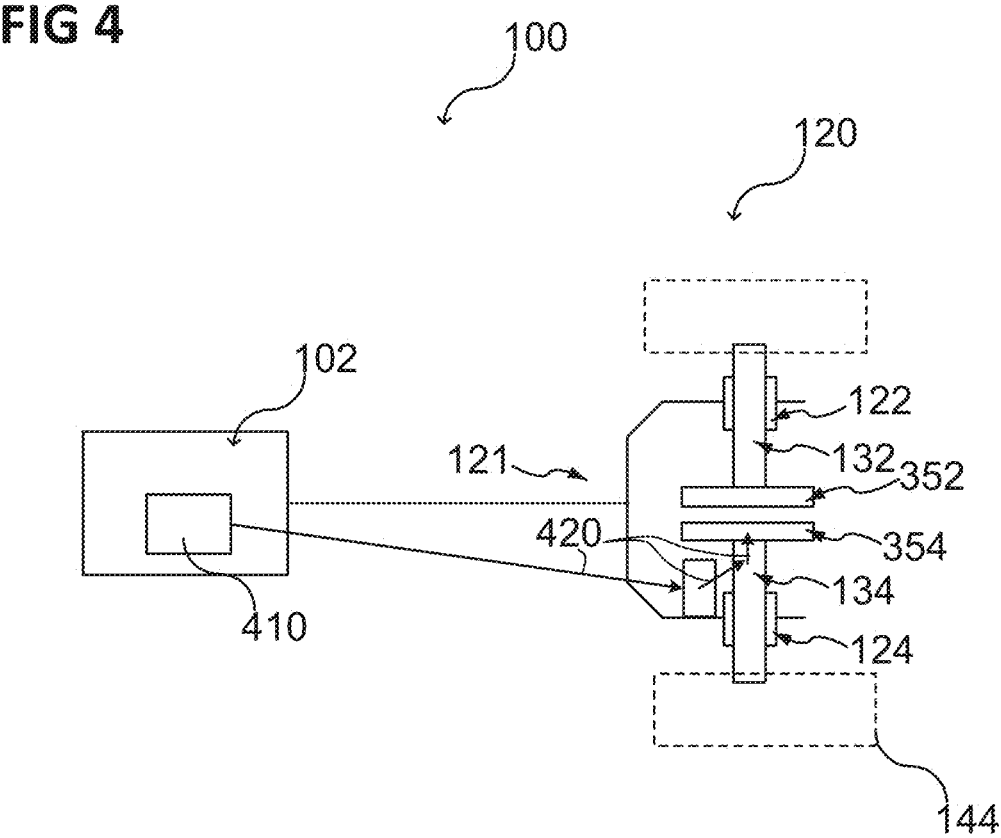
FIG. 4 shows an unmanned aerial vehicle including an electric drive motor in a schematic view, according to various aspects.

FIG. 4 illustrates an electric drive motor 120 mounted at a frame 102 of an unmanned aerial vehicle in a schematic view, according to various aspects. The electric drive motor 120 may further include an electrical contact structure 420 configured to electrically contact at least one of the first magnetic arrangement 352 or the second magnetic arrangement 354. Illustratively, in the case that only one or both of the magnetic arrangements 352, 354 include a magnet coil arrangement, the magnet coil arrangement may be supplied with electrical power via the electrical contact structure 420.

According to various aspects, the unmanned aerial vehicle 100 may include at least one direct current (DC) power supply 410. The at least one DC power supply 410 may be electrically coupled to the electrical contact structure 420 to supply one or both of the magnetic arrangements 352, 354. The at least one DC power supply 410 may include at least one of the following group of DC power supplies: one or more (e.g., rechargeable) batteries, one or more fuel cells, one or more solar cells, etc. A battery may be or include one or more battery cells. A battery may include a lithium-polymer battery (Li—Po). The one or more batteries may be exchangeable, e.g. in order to charge the one or more batteries.

In the case that the electric drive motor 120 may be configured to operate based on an alternating current (AC), a DC/AC converter may be used to provide the AC current from the DC power supply 410.

According to various aspects, a motor controller and/or a flight controller may be electrically coupled to the at least one DC power supply 410 and one or both of the magnetic arrangements 352, 354. According to various aspects, the electrical power may be transferred from the static part of the unmanned aerial vehicle 100 (e.g., from the frame 102 with the power supply 410 or from the mount structure 121 of the electric drive motor 120) to the rotatably mounted second drive rotor structure 134 via any suitable electrical connection, as illustrated in FIG. 4. In a similar way, the electrical power may be transferred from the static part of the unmanned aerial vehicle 100 (e.g., the frame 102 with the power supply 410 or from the mount structure 121 of the electric drive motor 120) to the rotatably mounted first drive rotor structure 132, in the case that electrical power is used there.

According to various aspects, the mount structure 121 of the electric drive motor 120 may be connected to the frame 102 of the unmanned aerial vehicle 100.

FIG. 5 illustrates an unmanned aerial vehicle (e.g., the unmanned aerial vehicle 100 as described before) in a schematic view, according to various aspects. The unmanned aerial vehicle 100 may include one or more motor controllers 502c configured to control each electric drive motor 120 of the at least three vehicle drive arrangements 110.

Further, the unmanned aerial vehicle 100 may include one or more flight controllers 502f configured to control flight of the unmanned aerial vehicle 100. The one or more flight controllers 502f may be configured, for example, to provide a flight path based at least on an actual position of the unmanned aerial vehicle 100 and a desired target position for the unmanned aerial vehicle 100. In some aspects, the one or more flight controllers 502f may directly control the electric drive motors 120, so that no additional motor controller 502c is used. Alternatively, the one or more flight controllers 502f may control the electric drive motors 120 via one or more motor controllers 502c.

The one or more flight controllers 502f may include one or more processors, one or more memories, one or more communication interfaces, one or more interfaces, e.g., and one or more power interfaces to connect the one or more flight controllers 502f to the power supply 410, one or more control interfaces to connect the one or more flight controllers 502f to the electric drive motors and/or to one or more motor controllers 502c. The one or more flight controllers 502f may include any type of controller suitable for controlling the desired functions of the unmanned aerial vehicle 100. The one or more processors may be implemented by any kind of one or more logic circuits. The one or more memories may be implemented by any kind of one or more electronic storing entities, e.g. a one or more volatile memories and/or one or more non-volatile memories.

According to various aspects, the unmanned aerial vehicle 100 may include one or more sensors 502s. The one or more sensors 502s may be configured to monitor an environment of the unmanned aerial vehicle 100. The one or more sensors 502s may be configured to detect obstacles in the environment of the unmanned aerial vehicle 100. Therefore, the one or more flight controllers 502f may be further configured to modify the flight path of the unmanned aerial vehicle 100 based on detected obstacles to generate a collision free flight path to the desired target position avoiding obstacles in the environment of the unmanned aerial vehicle.

The one or more sensors 502s may include, for example, a camera, an ultrasonic sensor, etc. The unmanned aerial vehicle 100 may further include a position detection system 502p. The position detection system 502p may be based, for example, on global positioning system (GPS) or any other available positioning system. Therefore, the one or more flight controllers 502f may be further configured to modify the flight path of the unmanned aerial vehicle 100 based on data obtained from the position detection system 502p.

According to various embodiments, the one or more flight controllers 502f may include a transceiver configured to provide an uplink transmission and/or downlink reception of radio signals including data, e.g. video or image data and/or commands. The transceiver may include a radio frequency (RF) transmitter and/or a radio frequency (RF) receiver.

The one or more flight controllers 502f may further include an inertial measurement unit (IMU) and/or a compass unit. The inertial measurement unit allows, for example, a calibration of the unmanned aerial vehicle 100 regarding a predefined plane in a coordinate system, e.g., to determine the roll and pitch angle of the unmanned aerial vehicle 100 with respect to the gravity vector (e.g. from planet earth). Thus, an orientation of the unmanned aerial vehicle 100 in a coordinate system may be determined. The orientation of the unmanned aerial vehicle 100 may be calibrated using the inertial measurement unit before the unmanned aerial vehicle 100 is operated in flight modus. However, any other suitable function for navigation of the unmanned aerial vehicle 100, e.g., for determining a position, a flight velocity, a flight direction, etc., may be implemented in the one or more flight controllers 502f and/or in additional components coupled to the one or more flight controllers 502f.

FIG. 6 illustrates a schematic flow diagram of a method 600 for driving an unmanned aerial vehicle (e.g., to fly the unmanned aerial vehicle), according to various aspects. The method 600 may be applied to an unmanned aerial vehicle 100 as described herein. According to various aspects, the method 600 may include: in 610, supplying electrical power to an electrical drive motor, the electrical drive motor including a first magnetic arrangement being mounted to a first drive rotor structure and a second magnetic arrangement being mounted to a second drive rotor structure, the first drive rotor structure being coaxially aligned with the second drive rotor structure, and the first drive rotor structure being coupled to a top propeller and the second rotor structure being coupled to a bottom propeller; and, in 620, generating a first rotational moment associated with the first drive rotor structure and a second counteracting rotational moment associated with the second drive rotor structure via the first magnetic arrangement and the second magnetic arrangement such that the first drive rotor structure and the second drive rotor structure rotate in opposite rotational directions.

The method 600 may further include, rotating the first drive rotor structure with a first angular velocity and the second drive rotor structure with a second angular velocity different from the first angular velocity. Alternatively, the method 600 may further include, rotating the first drive rotor structure with a first angular velocity and the second drive rotor structure with a second angular velocity equal to the first angular velocity.

Figure 7:
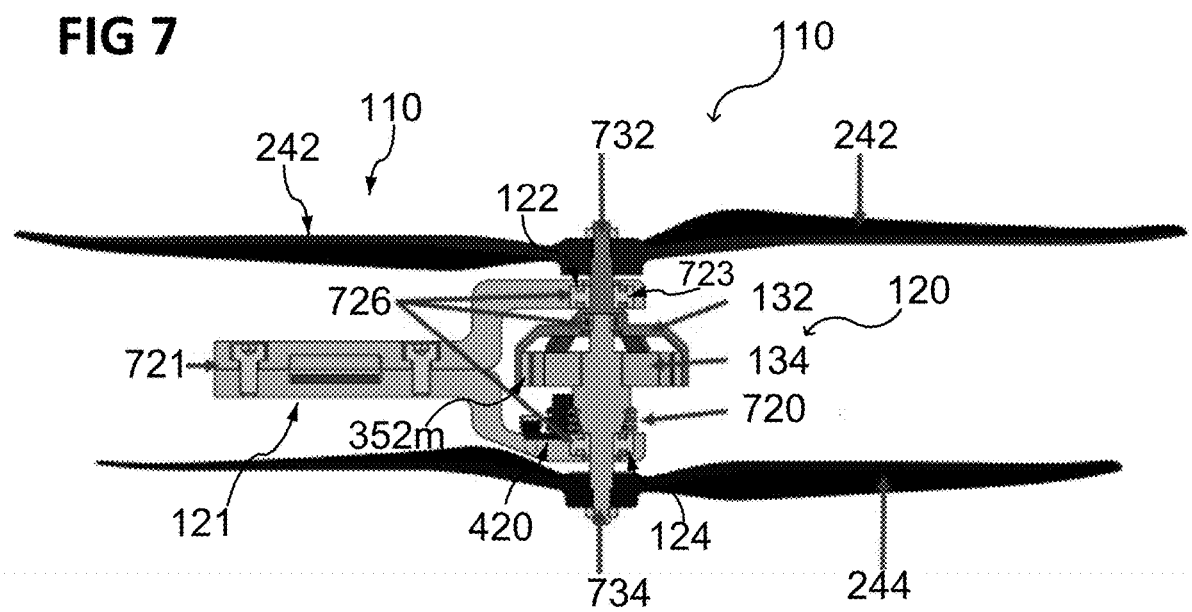
FIG. 7 shows a vehicle drive arrangement of an unmanned aerial vehicle in a schematic view, according to various aspects.

FIG. 7 illustrates a vehicle drive arrangement 110 of an unmanned aerial vehicle, according to various aspects. The vehicle drive arrangement 110 may include an electric drive motor 120 and attached propellers 242, 244.

The first drive rotor structure 132 may include a first drive shaft 732. The first drive shaft 732 may extend through the first bearing 122 to mount the first drive rotor structure 132 rotatably. The first propeller 242 may be mounted to the first drive shaft 732. The first drive shaft 732 may be an elongated (e.g., cylindrical) portion of the first drive rotor structure 132.

Further, the second drive rotor structure 134 may include a second drive shaft 734. The second drive shaft 734 may extend through the second bearing 124 to mount the second drive rotor structure 134 rotatably. The second propeller 244 may be mounted to the second drive shaft 734. The second drive shaft 734 may be an elongated (e.g., cylindrical) portion of the second drive rotor structure 134.

The respective drive shaft 732, 734 may include a detachable connection structure to connect the respective propeller 242, 244 to the corresponding drive shaft 732, 734.

According to various aspects, the mount structure may be formed by at least two-pieces, a top portion connected to the first bearing 122 and a bottom portion connected to the second bearing 124. The top portion and the bottom portion may include a detachable connection structure 721 to connect the top portion and the bottom portion to one another. Further, the connection structure 721 may be configured to detachably connect the vehicle drive arrangement 110 to the frame 102 of the unmanned aerial vehicle 100 (see, for example, FIG. 1A).

According to various aspects, the electric drive motor 120 of the vehicle drive arrangement 110 may further include a third bearing 723. The third bearing 723 may be configured to couple the first drive rotor structure 132 and the second drive rotor structure 134 rotatably with each other. The third bearing 723 may include a ball bearing, a roller bearing, etc. According to various aspects, the third bearing 723 may be arranged between a first portion of the first drive rotor structure 132 and a second portion of the second drive rotor structure 134. As an example, a portion of the first drive rotor structure 132 may at least partially surround the third bearing 723 and a portion of the second drive rotor structure 134 may at least partially extend into the third bearing 723. The third bearing 723 may stabilize the rotation of the drive rotor structures 132, 134.

According to various aspects, the electrical contact structure 420 that electrically contacts the second drive rotor structure 134 may include one or more electrical slip contacts, e.g. one or more brush contacts and/or one or more slip rings 720. The electrical contact structure 420 may include a portion that is attached to the mount structure 121 to transfer the electrical power to the one or more slip rings 720. The electrical power that may be transferred to the second drive rotor structure 134 may be used to supply the second magnetic arrangement 354, e.g., a magnet coil arrangement. In this case, the first magnetic arrangement 352 of the first drive rotor structure 132 may include a plurality of permanent magnets 352m, or alternatively, a plurality of inductor coils (e.g., short-circuited electromagnetic coils).

According to various aspects, each propeller 242, 244 may have at least two propeller blades, e.g., two, three, four, five, six, or more the six propeller blades. The propeller blades may be aligned in an equiangular arrangement. According to various aspects, the propeller blades may have the same shape and or size. Alternatively, pairs of propeller blades may include different shapes, e.g., a first propeller blade may be in a tractor (also referred to as pull) configuration and a second propeller blade may be in pusher (also referred to as push) configuration.

As illustrated in FIG. 7, the first drive rotor structure 132 and the second drive rotor structure 134 may be mounted to the mount structure 121 via a bearing arrangement 726 including at least three bearings 122, 124, 723.

In the following, various examples are provided with reference to the aspects described above.

Example 1 is an unmanned aerial vehicle. The unmanned aerial vehicle may include a frame, and at least three vehicle drive arrangements coupled to the frame. Each vehicle drive arrangement of the at least three vehicle drive arrangements includes an electric drive motor. The electric drive motor includes a mount structure, a first bearing and a second bearing, a first drive rotor structure rotatably mounted at the mount structure via the first bearing, and a second drive rotor structure rotatably mounted at the mount structure via the second bearing.

In Example 2, the subject matter of Example 1 can optionally include that each vehicle drive arrangement of the at least three vehicle drive arrangements further includes a first propeller coupled to the first drive rotor structure and a second propeller coupled to the second drive rotor structure.

In Example 3, the subject matter of Example 2 can optionally include that the first propeller has a first propeller pitch that is fixed and the second propeller has a second propeller pitch that is fixed. The first propeller pitch is different from the second propeller pitch.

In Example 4, the subject matter of Example 3 can optionally include that the second propeller pitch is greater than the first propeller pitch.

In Example 5, the subject matter of any one of Examples 2 to 4 can optionally include that the first propeller has a first diameter, and the second propeller has a second diameter that is different from the first diameter.

In Example 6, the subject matter of Example 5 can optionally include that the first diameter is greater than the second diameter.

In Example 7, the subject matter of any one of Examples 2 to 6 can optionally include that the first propeller is a top propeller, and the second propeller is a bottom propeller.

In Example 8, the subject matter of any one of Examples 2 to 7 can optionally include that the first drive rotor structure includes a first drive shaft, the first drive shaft extending through the first bearing.

In Example 9, the subject matter of Example 8 can optionally include that the first propeller is mounted to the first drive shaft.

In Example 10, the subject matter of any one of Examples 2 to 9 can optionally include that the second drive rotor structure includes a second drive shaft, the second drive shaft extending through the second bearing.

In Example 11, the subject matter of Example 10 can optionally include that the second propeller is mounted to the second drive shaft.

In Example 12, the subject matter of any one of Examples 1 to 11 can optionally include that the electric drive motor further includes a third bearing rotatably coupling the first drive rotor structure and the second drive rotor structure with each other.

In Example 13, the subject matter of Example 12 can optionally include that the third bearing is arranged between a first portion of the first drive rotor structure and a second portion of the second drive rotor structure.

In Example 14, the subject matter of any one of Examples 1 to 13 can optionally include that the electric drive motor further includes a first magnetic arrangement disposed at the first drive rotor structure and a second magnetic arrangement disposed at the second drive rotor structure.

In Example 15, the subject matter of Example 14 can optionally include that the electric drive motor further includes an air gap disposed between the first magnetic arrangement and the second magnetic arrangement.

In Example 16, the subject matter of any one of Examples 14 or 15 can optionally include that the first magnetic arrangement further includes at least one of a permanent magnet arrangement or an electromagnetic coil arrangement.

In Example 17, the subject matter of any one of Examples 14 to 16 can optionally include that the second magnetic arrangement includes at least one of a permanent magnet arrangement or an electromagnetic coil arrangement.

In Example 18, the subject matter of any one of Examples 14 to 17 can optionally include that the first magnetic arrangement and the second magnetic arrangement are configured to provide a first rotational moment associated with the first drive rotor structure and a second counteracting rotational moment associated with the second drive rotor structure.

In Example 19, the subject matter of any one of Examples 14 to 18 can optionally include that the first magnetic arrangement and the second magnetic arrangement are disposed between the first bearing and the second bearing.

In Example 20, the subject matter of any one of Examples 14 to 19 can optionally include that the electric drive motor further includes an electrical contact structure configured to electrically contact at least one of the first magnetic arrangement or the second magnetic arrangement.

In Example 21, the subject matter of Example 20 can optionally include that the electrical contact structure includes one or more electrical slip contacts.

In Example 22, the subject matter of any one of Examples 20 or 21 can optionally include that the unmanned aerial vehicle further includes at least one directed current power supply electrically coupled to the electrical contact structure.

In Example 23, the subject matter of Example 22 can optionally include that the at least one directed current power supply includes at least one of the following group of directed current power supplies: one or more batteries, one or more rechargeable batteries, one or more fuel cells, one or more solar cells.

In Example 24, the subject matter of any one of Examples 1 to 23 can optionally include that the unmanned aerial vehicle further includes one or more motor controllers configured to control each electric drive motor of the at least three vehicle drive arrangements.

In Example 25, the subject matter of any one of Examples 1 to 24 can optionally include that the unmanned aerial vehicle further includes one or more flight controllers are configured to control flight of the unmanned aerial vehicle.

In Example 26, the subject matter of Example 25 can optionally include that the one or more flight controllers are configured to provide a flight path based at least on an actual position of the unmanned aerial vehicle and a desired target position for the unmanned aerial vehicle.

In Example 27, the subject matter of any one of Examples 1 to 26 can optionally include that the unmanned aerial vehicle further includes one or more sensors configured to monitor an environment of the unmanned aerial vehicle.

In Example 28, the subject matter of Example 27 can optionally include that the one or more sensors are configured to detect obstacles in the environment.

In Example 29, the subject matter of Examples 26 and 28 can optionally include that the one or more flight controllers are further configured to modify the flight path based on detected obstacles to generate a collision free flight path to the desired target position avoiding obstacles in the environment of the unmanned aerial vehicle.

In Example 30, the subject matter of any one of Examples 1 to 29 can optionally include that the mount structure of the electric drive motor is mounted to the frame.

In Example 31, the subject matter of any one of Examples 1 to 30 can optionally include that the unmanned aerial vehicle further includes one or more protection structures at least partially surrounding each vehicle drive arrangement of the at least three vehicle drive arrangements.

Example 32 is an unmanned aerial vehicle. The unmanned aerial vehicle may include a frame, and at least three vehicle drive arrangements coupled to the frame. Each vehicle drive arrangement of the at least three vehicle drive arrangements includes an electric drive motor. The electric drive motor includes a first drive rotor structure, and a second drive rotor structure. The first drive rotor structure is coaxially aligned with the second drive rotor structure. The first drive rotor structure includes a first magnetic arrangement and the second drive rotor structure includes a second magnetic arrangement.

In Example 33, the subject matter of Example 32 can optionally include that each vehicle drive arrangement of the at least three vehicle drive arrangements further includes a first propeller coupled to the first drive rotor structure and a second propeller coupled to the second drive rotor structure.

In Example 34, the subject matter of Example 33 can optionally include that the first propeller has a first propeller pitch that is fixed and the second propeller has a second propeller pitch that is fixed. The first propeller pitch is different from the second propeller pitch.

In Example 35, the subject matter of Example 34 can optionally include that the second propeller pitch is greater than the first propeller pitch.

In Example 36, the subject matter of any one of Examples 33 to 35 can optionally include that the first propeller has a first diameter and the second propeller has a second diameter that is different from the first diameter.

In Example 37, the subject matter of Example 36 can optionally include that the first diameter is greater than the second diameter.

In Example 38, the subject matter of any one of Examples 33 to 37 can optionally include that the first propeller is a top propeller and the second propeller is a bottom propeller.

In Example 39, the subject matter of any one of Examples 33 to 38 can optionally include that the electric drive motor further includes a first bearing, and the first drive rotor structure includes a first drive shaft, the first drive shaft extending through the first bearing.

In Example 40, the subject matter of Example 39 can optionally include that the first propeller is mounted to the first drive shaft.

In Example 41, the subject matter of any one of Examples 33 to 40 can optionally include that the electric drive motor further includes a second bearing, and the second drive rotor structure includes a second drive shaft, the second drive shaft extending through the second bearing.

In Example 42, the subject matter of Example 41 can optionally include that the second propeller is mounted to the second drive shaft.

In Example 43, the subject matter of any one of Examples 39 to 42 can optionally include that the electric drive motor further includes a third bearing rotatably coupling the first drive rotor structure and the second drive rotor structure with each other.

In Example 44, the subject matter of Example 43 can optionally include that the third bearing is arranged between a first portion of the first drive rotor structure and a second portion of the second drive rotor structure.

In Example 45, the subject matter of any one of Examples 32 to 44 can optionally include that the electric drive motor further includes an air gap disposed between the first magnetic arrangement and the second magnetic arrangement.

In Example 46, the subject matter of any one of Examples 32 to 45 can optionally include that the first magnetic arrangement includes at least one of a permanent magnet arrangement or an electromagnetic coil arrangement.

In Example 47, the subject matter of any one of Examples 32 to 46 can optionally include that the second magnetic arrangement includes at least one of a permanent magnet arrangement or an electromagnetic coil arrangement.

In Example 48, the subject matter of any one of Examples 32 to 47 can optionally include that the first magnetic arrangement and the second magnetic arrangement are configured to provide a first rotational moment associated with the first drive rotor structure and a second counteracting rotational moment associated with the second drive rotor structure to rotate the first drive rotor structure and the second drive rotor structure in opposite rotational directions.

In Example 49, the subject matter of any one of Examples 32 to 48 can optionally include that the electric drive motor further includes an electrical contact structure configured to electrically contact at least one of the first magnetic arrangement or the second magnetic arrangement.

In Example 50, the subject matter of Example 49 can optionally include that the electrical contact structure includes one or more electrical slip contacts.

In Example 51, the subject matter of any one of Examples 49 or 50 can optionally include that the unmanned aerial vehicle further includes at least one power supply electrically coupled to the electrical contact structure.

In Example 52, the subject matter of Example 51 can optionally include that the at least one power supply includes at least one of the following group of power supplies: one or more batteries, one or more rechargeable batteries, one or more fuel cells, one or more solar cells.

In Example 53, the subject matter of any one of Examples 32 to 52 can optionally include that the unmanned aerial vehicle further includes one or more motor controllers configured to control each electric drive motor of the at least three vehicle drive arrangements.

In Example 54, the subject matter of any one of Examples 32 to 53 can optionally include that the unmanned aerial vehicle further includes one or more flight controllers configured to control flight of the unmanned aerial vehicle.

In Example 55, the subject matter of Example 54 can optionally include that the one or more flight controllers are configured to provide a flight path based at least on an actual position of the unmanned aerial vehicle and a desired target position for the unmanned aerial vehicle.

In Example 56, the subject matter of any one of Examples 32 to 55 can optionally include that the unmanned aerial vehicle further includes one or more sensors configured to monitor an environment of the unmanned aerial vehicle.

In Example 57, the subject matter of Example 56 can optionally include that the one or more sensors are configured to detect obstacles in the environment.

In Example 58, the subject matter of any one of Examples 55 and 57 can optionally include that the one or more flight controllers are further configured to modify the flight path based on detected obstacles to generate a collision free flight path to the desired target position avoiding obstacles in the environment of the unmanned aerial vehicle.

In Example 59, the subject matter of any one of Examples 32 to 58 can optionally include that the electric dive motor further includes a mount structure to mount the respective vehicle drive arrangement of the at least three vehicle drive arrangements to a frame.

Example 60 is an unmanned aerial vehicle. The unmanned aerial vehicle may include one or more electric drive motors. Each drive motor of the one or more electric drive motors includes a first drive rotor structure, a second drive rotor structure, the first drive rotor structure being coaxially aligned with the second drive rotor structure. The first drive rotor structure includes a first magnetic arrangement and the second drive rotor structure includes a second magnetic arrangement.

In Example 61, the subject matter of Example 60 can optionally include that the first magnetic arrangement and the second magnetic arrangement are configured to provide a first rotational moment associated with the first drive rotor structure and a second counteracting rotational moment associated with the second drive rotor structure to rotate the first drive rotor structure and the second drive rotor structure in opposite rotational directions.

Example 62 is a method for driving an unmanned aerial vehicle. The method may include supplying electrical power to an electrical drive motor. The electrical drive motor includes a first magnetic arrangement being attached at a first drive rotor structure and a second magnetic arrangement being attached at a second drive rotor structure, the first drive rotor structure being coaxially aligned with the second drive rotor structure, and the first drive rotor structure being coupled to a top propeller and the second rotor structure being coupled to a bottom propeller. The method may further include generating a first rotational moment associated with the first drive rotor structure and a second counteracting rotational moment associated with the second drive rotor structure via the first magnetic arrangement and the second magnetic arrangement such that the first drive rotor structure and the second drive rotor structure rotate in opposite rotational directions.

In Example 63, the subject matter of Example 62 can optionally include that the method further includes rotating the first drive rotor structure with a first angular velocity and the second drive rotor structure with a second angular velocity different from the first angular velocity.

In Example 64, the subject matter of Example 62 can optionally include that the method further includes rotating the first drive rotor structure with a first angular velocity and the second drive rotor structure with a second angular velocity equal to the first angular velocity.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An unmanned aerial vehicle, comprising:
   a frame; and
   at least three vehicle drive arrangements coupled to the frame,
   wherein each vehicle drive arrangement of the at least three vehicle drive arrangements comprises an electric drive motor, and
   wherein each electric drive motor of the at least three vehicle drive arrangements comprises:
   a mount structure;
   a first bearing;
   a second bearing;
   a first drive rotor structure rotatably mounted at the mount structure via the first bearing;
   a second drive rotor structure rotatably mounted at the mount structure via the second bearing; and
   a third bearing rotatably coupling the first drive rotor structure and the second drive rotor structure with each other.

2. The unmanned aerial vehicle of claim 1,
   wherein each vehicle drive arrangement of the at least three vehicle drive arrangements further comprises:
   a first propeller coupled to the first drive rotor structure; and
   a second propeller coupled to the second drive rotor structure.

3. The unmanned aerial vehicle of claim 2,
   wherein the first propeller has a first propeller pitch that is fixed,
   wherein the second propeller has a second propeller pitch that is fixed, and
   wherein the first propeller pitch is different from the second propeller pitch.

4. The unmanned aerial vehicle of claim 3,
   wherein the second propeller pitch is greater than the first propeller pitch.

5. The unmanned aerial vehicle of claim 2,
   wherein the first propeller has a first diameter,
   wherein the second propeller has a second diameter, and
   wherein the first diameter is different from the second diameter.

6. The unmanned aerial vehicle of claim 2,
   wherein the first drive rotor structure comprises a first drive shaft, and
   wherein the first drive shaft extends through the first bearing.

7. The unmanned aerial vehicle of claim 2,
   wherein the second drive rotor structure comprises a second drive shaft, and
   wherein the second drive shaft extends through the second bearing.

8. The unmanned aerial vehicle of claim 1,
   wherein the third bearing is between a first portion of the first drive rotor structure and a second portion of the second drive rotor structure.

9. The unmanned aerial vehicle of claim 1, further comprising:
   one or more flight controllers configured to control flight of the unmanned aerial vehicle.

10. The unmanned aerial vehicle of claim 9,
    wherein the one or more flight controllers are further configured to provide a flight path based at least on an actual position of the unmanned aerial vehicle and a desired target position for the unmanned aerial vehicle.

11. The unmanned aerial vehicle of claim 1, further comprising:
one or more sensors configured to monitor an environment of the unmanned aerial vehicle.

12. A vehicle drive arrangement for an unmanned aerial vehicle, the vehicle drive arrangement comprising:
a first propeller;
a second propeller; and
a single electric drive motor configured to be coupled between the first propeller and the second propeller,
wherein the single electric drive motor comprises:
a first drive rotor structure; and
a second drive rotor structure,
wherein the first drive rotor structure is coaxially aligned with the second drive rotor structure,
wherein the first drive rotor structure comprises a first magnetic arrangement, and
wherein the second drive rotor structure comprises a second magnetic arrangement.

13. The vehicle drive arrangement of claim 12,
wherein the first propeller is coupled to the first drive rotor structure, and
wherein the second propeller is coupled to the second drive rotor structure.

14. The vehicle drive arrangement of claim 13,
wherein the first propeller has a first propeller pitch that is fixed,
wherein the second propeller has a second propeller pitch that is fixed, and
wherein the first propeller pitch is different from the second propeller pitch.

15. The vehicle drive arrangement of claim 14,
wherein the second propeller pitch is greater than the first propeller pitch.

16. The vehicle drive arrangement of claim 12,
wherein the single electric drive motor further comprises an air gap between the first magnetic arrangement and the second magnetic arrangement.

17. The vehicle drive arrangement of claim 12,
wherein the first magnetic arrangement and the second magnetic arrangement are configured to:
provide a first rotational moment associated with the first drive rotor structure, and
provide a second counteracting rotational moment associated with the second drive rotor structure to rotate the first drive rotor structure and the second drive rotor structure in opposite rotational directions.

18. The vehicle drive arrangement of claim 12,
wherein the single electric drive motor is configured to be directly coupled between the first propeller and the second propeller.

19. An electric drive motor for an unmanned aerial vehicle, the electric drive motor comprising:
a first drive rotor structure; and
a second drive rotor structure,
wherein the first drive rotor structure is coaxially aligned with the second drive rotor structure,
wherein the first drive rotor structure comprises a first magnetic arrangement,
wherein the second drive rotor structure comprises a second magnetic arrangement, and
wherein the electric drive motor is configured to be the only electric drive motor coupled between a first propeller of the unmanned aerial vehicle and a second propeller of the unmanned aerial vehicle.

20. The electric drive motor of claim 19,
wherein the first magnetic arrangement and the second magnetic arrangement are configured to:
provide a first rotational moment associated with the first drive rotor structure, and
provide a second counteracting rotational moment associated with the second drive rotor structure to rotate the first drive rotor structure and the second drive rotor structure in opposite rotational directions.

* * * * *